Patented Oct. 6, 1942

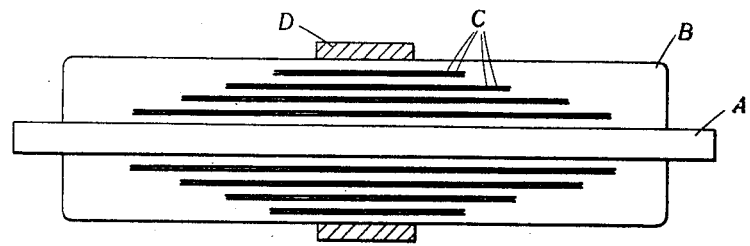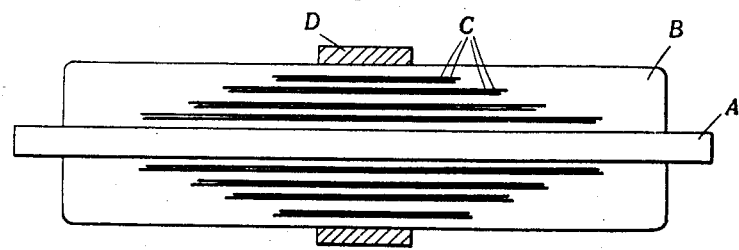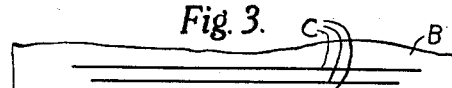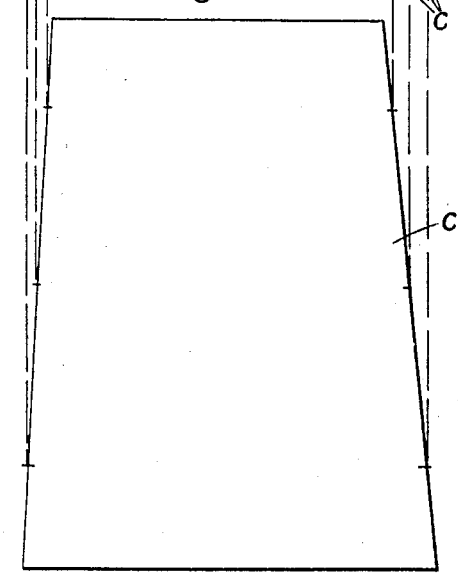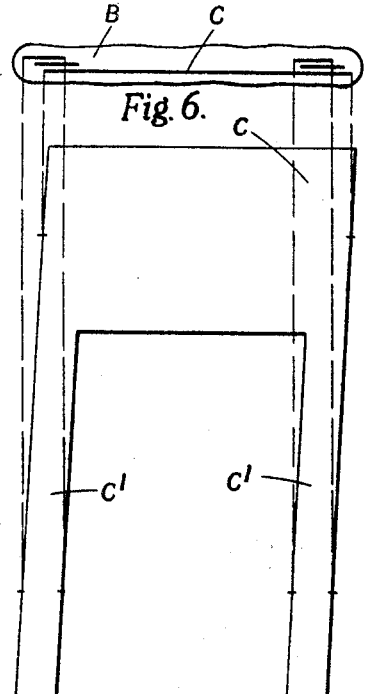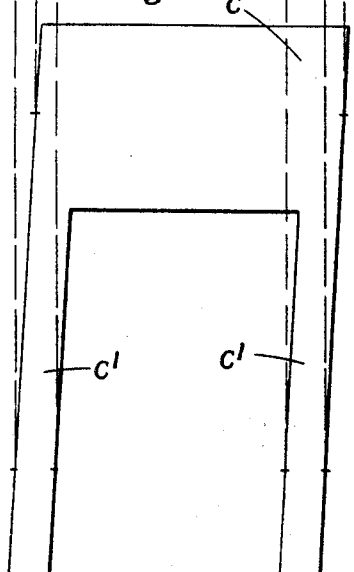

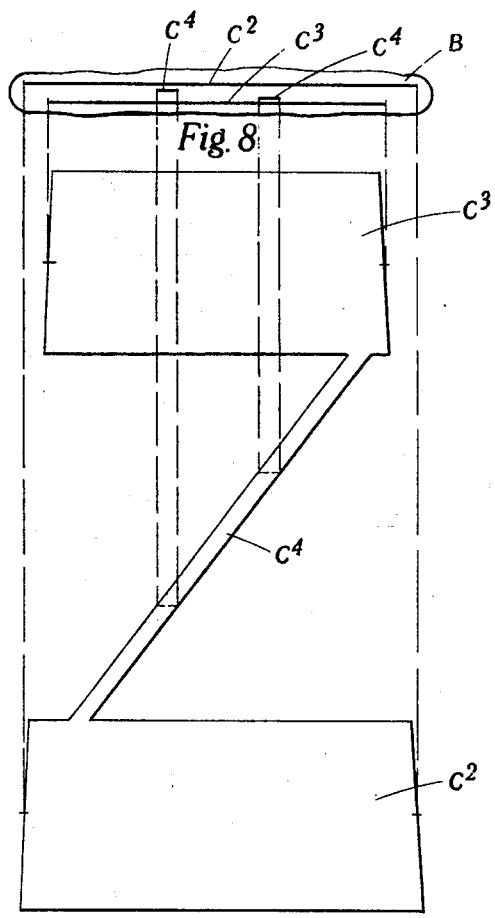

2,298,118

UNITED STATES PATENT OFFICE 2,298,118

ELECTRIC INSULATOR

Harry Major Gale, Jarrow-on-Tyne, and Ian Ward Anderson Kirkwood, Newcastle-on-Tyne, England, assignors to A. Reyrolle & Company Limited, Hebburn-on-Tyne, England, a company of Great Britain Application March 12, 1941, Serial No. 383,050
In Great Britain April 1, 1940

11 Claims. (Cl. 174—143)

This invention relates to laminated electric insulators including stress-grading condenser layers, for example insulators wound from varnished or impregnated paper.

In order to avoid the formation of gas pockets or voids at the edges of the conducting layers in such an insulator it is desirable to employ conducting layers of thin, easily-adhering material such, for example, as metallised paper. On the other hand the fact that such a material is thin and therefore presents a sharp edge means that the potential gradient at that edge is correspondingly high and in fact the potential gradient at the edges of such conducting layers is many times greater than in the main bulk of the insulator. Such a high potential gradient may produce local ionisation or heating in the dielectric, which in turn may cause decomposition and destruction of its insulating properties and lead ultimately to failure of the whole insulator since decomposition, once started, is cumulative.

On the other hand, if the layers are made thicker difficulties arise owing to the formation of gas pockets or voids, since successive layers of the insulation do not closely follow the contour of the conducting layer at the edge of the latter, and a wedge-shaped void tends to be produced resulting in discharges or hissing, owing to the fact that the dielectric strength of the gas is considerably less than that of the solid insulation. Again, local decomposition and destruction of the insulating properties of the dielectric may occur, leading ultimately to the failure of the whole insulator.

According to the present invention a condenser insulator of the kind described includes groups of two or more condenser layers of thin easily-adhering material, the layers of a group being close together at substantially the same potential and the ends of the layers of a group being approximately level with one another at at least one end of the group. Thus each group may consist of a number of layers of approximately the same length, or it may consist of a single layer of substantial length and one or more short layers all having their ends approximately level with one another at one end of the group. In the latter case the short layers may be wound inside and/or outside one end or preferably each end of the long one.

Thus as far as adhesion of the material is concerned the advantages of a thin material are retained whereas from the point of view of stress distribution the effect obtained resembles that of using a layer of comparatively thick material.

A further improvement in the distribution of the lines of stress can be obtained if the ends of the layers of a group, whilst approximately level with one another, are not exactly so. This where one group of layers extends beyond another the layers of the latter group are preferably staggered so that the layer remote from the other group extends furthest. In short if the groups and the layers of each group are staggered in opposite directions the distribution of stress is rendered more uniform.

It will be understood that a group of any number of layers may be used to replace each layer of the normal arrangement.

The invention may be carried into effect in many different ways but certain embodiments thereof will be described by way of example with reference to the accompanying drawings in which:

Figure 1 is a diagrammatic cross-section of one form of condenser bushing insulator.

Figure 2 is a similar view of a modification.

Figure 3 is a fragmentary view of a slightly different embodiment than Figure 2; this fragmentary figure showing two of the groups of condenser layers on the upper half of the arrangement.

Figures 5 and 7 are fragmentary views of various other arrangements of a group of condenser layers, and Figures 4, 6 and 8 are diagrams of the developments of the conducting material used for the arrangements of Figures 3, 5 and 7 respectively.

As indicated in Figure 1 the bushing insulator surrounds a central conductor A and comprises a tubular body B formed by winding paper impregnated with a material such as a heat-hardening synthetic resin. At intervals condenser layers C of thin conducting material preferably perforated to improve adhesion are wound in between the layers of paper. A metallic flange D surrounds the insulator.

In accordance with the invention the condenser layers are not evenly spaced but are arranged in groups of two or more layers so close together as to constitute virtually a single layer. The layers of each group may for example be wound separately at slightly different diameters, or they may be formed by continuously winding in two or more complete convolutions of the conducting layer material.

In the first case there will be a small potential difference between the layers of each group, while in the second case there will be no potential difference, and there will normally be one layer of the insulating material between successive conducting layers, although special winding arrangements could enable more layers of insulating material to be inserted. For example two or more layers of insulating material may be wound on to the insulator at the same time.

In Figure 1 the layers of a group are shown as being of precisely the same length whereas in Figure 2 the outer layer of each group is slightly longer than the inner layer, each group being considerably shorter than the one inside it.

The developed shape of the material of the layer prior to winding will depend on the type of insulator being made. Thus to wind from a single piece of material a group of layers having their ends exactly level, a rectangular shape may be employed. If opposite ends are to be oppositely staggered as indicated in Figure 3 a tapered or trapezium shape will be required as indicated in Figure 4. If they are to be staggered in the same direction a parallelogram will be required. Where a single long layer and a number of short layers are to be formed as indicated in Figure 5 the same shape may be used with a piece of similar shape cut out to leave strips $C^1$ along the edges which will form the ends as indicated in Figure 6. If the strips are wound in first the short layers will be inside the long one whereas if the straight edge goes in first the short layers will be outside.

If two or more convolutions of insulating material are desired between successive conducting layers $C^2$ and $C^3$ of a group, the layers of which are required to be at the same potential, they may be connected together by a strip $C^4$ of conducting material as indicated in Figure 7. In this case the developed shape of the conducting layer material may, as indicated in Figure 8, consist of two or more rectangles connected together by thin strips which when wound in are in a zone in which there is no potential gradient. The connecting strips are preferably arranged diagonally so that when wound in they do not lie directly over one another and cause a thickening of the insulator at one point in its length.

It will be understood that other shapes may be employed for various forms of potential gradient control at the edges of the conducting layers.

In condenser insulators manufactured in accordance with this invention, the high potential gradient that exists at the edges of the conducting layers in normal insulators is relieved by increasing the effective thickness of the layers without increasing the actual thickness of the conducting layer material; in fact the latter may be reduced with consequent improvement in the adhesion between the layers of insulating material at the edges of the conducting layers.

What we claim as our invention and desire to secure by Letters Patent is:

1. An electric tubular wound insulator including a body of insulating material and condenser layers of thin easily adhering material embedded in said material and arranged in groups each of which comprises a plurality of layers terminating approximately level with one another at at least one end of the group and situated close together at substantially the same electrical potential, but separated in a radial direction by at least one layer of insulating material.

2. An electric tubular wound insulator including a body of insulating material and condenser layers of thin easily adhering material embedded in said material and arranged in groups each of which comprises a plurality of layers terminating approximately level with one another at at least one end of the group and situated close together and interconnected by a path of conducting material, but separated in a radial direction by at least one layer of insulating material.

3. An electric tubular wound insulator including a body of insulating material and, embedded in said material, condenser layers formed of thin easily adhering material and arranged in groups each of which comprises a plurality of layers formed by winding in a plurality of convolutions of a sheet of the conducting layer material, but separated in a radial direction by at least one layer of insulating material.

4. An electric insulator including a body of insulating material and condenser layers of thin easily adhering material embedded in said material and arranged in groups each of which comprises a plurality of layers situated close together at substantially the same electrical potential, the layers at one end of a group being staggered, and the corresponding ends of adjacent groups being staggered in an opposite direction.

5. An electric insulator including a body of insulating material and condenser layers of thin easily adhering material embedded in said material and arranged in groups each of which comprises a long layer of the full length of the group and at least one short layer terminating approximately level with one end of the long layer and situated close to it at substantially the same electrical potential.

6. An electric tubular wound insulator including a body of insulating material and, embedded in said material, condenser layers formed of thin easily adhering material and arranged in groups each of which comprises a plurality of layers formed by winding in a plurality of convolutions of a piece of the conducting layer material which is of trapezium shape so that opposite ends of the layers of the group are staggered in opposite directions.

7. An electric tubular wound insulator including a body of insulating material and, embedded in said material, condenser layers formed of thin easily adhering material and arranged in groups each of which comprises a plurality of layers formed by winding in a plurality of convolutions of a piece of the conducting layer material which is of parallelogram shape so that opposite ends of the layers of the group are staggered in the same direction.

8. An electric tubular wound insulator including a body of insulating material and, embedded in said material, condenser layers formed of thin easily adhering material and arranged in groups each of which comprises a plurality of layers formed by winding in a plurality of pieces of the conducting layer material each shaped to constitute a layer and connected together by a narrow strip of the material serving to maintain them at the same potential.

9. An electric tubular wound insulator including a body of insulating material and, embedded in said material, condenser layers formed of thin easily adhering material and arranged in groups each of which comprises a plurality of layers formed by winding in a plurality of pieces of the conducting layer material each shaped to constitute a layer and connected together by a narrow strip of the material extending obliquely between them and serving to maintain them at the same potential.

10. An electric tubular wound insulator including a body of insulating material and, embedded in said material, condenser layers formed of thin easily adhering material and arranged in groups each of which comprises a plurality of layers formed by winding in a piece of the conducting layer material comprising a portion shaped to constitute a long layer of the full length of the group and a narrow strip extending from at least one end to constitute at least one short layer terminating approximately level with one end of the long layer.

11. An electric tubular wound insulator including a body of insulating material and condenser layers of thin perforated easily adhering material embedded in said material and arranged in groups each of which comprises a plurality of layers terminating approximately level with one another at at least one end of the group and situated close together at substantially the same electrical potential, but separated in a radial direction by at least one layer of insulating material.

HARRY MAJOR GALE.
IAN WARD ANDERSON KIRKWOOD.